(12) United States Patent
Zhou et al.

(10) Patent No.: US 11,054,006 B2
(45) Date of Patent: Jul. 6, 2021

(54) MOTOR DEVICE WITH A LUBRICATION-SEALED TRANSMISSION CAVITY

(71) Applicant: Jiangsu Leili Motor Co., Ltd., Changzhou (CN)

(72) Inventors: Yong Zhou, Changzhou (CN); Jiajun Deng, Changzhou (CN)

(73) Assignee: JIANGSU LEILI MOTOR CO., LTD., Changzhou (CN)

( * ) Notice: Subject to any disclaimer, the term of this patent is extended or adjusted under 35 U.S.C. 154(b) by 15 days.

(21) Appl. No.: 16/554,346

(22) Filed: Aug. 28, 2019

(65) Prior Publication Data

US 2020/0072328 A1   Mar. 5, 2020

(30) Foreign Application Priority Data

Sep. 4, 2018   (CN) .......................... 201821446701.8

(51) Int. Cl.
*F16H 25/20*   (2006.01)

(52) U.S. Cl.
CPC ....... *F16H 25/20* (2013.01); *F16H 2025/209* (2013.01); *F16H 2025/2031* (2013.01); *F16H 2025/2084* (2013.01)

(58) Field of Classification Search
CPC .. F16H 57/0497; F16H 25/20; F16H 25/2418; F16H 2025/2031
USPC ...................................................... 74/606 R
See application file for complete search history.

(56) References Cited

U.S. PATENT DOCUMENTS

| | | | | |
|---|---|---|---|---|
| 10,641,341 | B2* | 5/2020 | Stoppel | F16D 1/064 |
| 2009/0293655 | A1* | 12/2009 | Tseng | F16H 25/2015 |
| | | | | 74/89.37 |
| 2012/0139395 | A1* | 6/2012 | Dietrich | A61G 7/018 |
| | | | | 310/68 B |
| 2013/0285494 | A1* | 10/2013 | Iversen | F16H 25/20 |
| | | | | 310/83 |
| 2014/0196555 | A1* | 7/2014 | Wu | F16H 25/20 |
| | | | | 74/89.23 |
| 2015/0078687 | A1* | 3/2015 | Yoshizaki | C10M 115/08 |
| | | | | 384/13 |

(Continued)

FOREIGN PATENT DOCUMENTS

| | | |
|---|---|---|
| CN | 201733170 U | 2/2011 |
| CN | 202545767 U | 11/2012 |

(Continued)

*Primary Examiner* — Jake Cook
*Assistant Examiner* — T. Scott Fix
(74) *Attorney, Agent, or Firm* — Husch Blackwell LLP

(57) ABSTRACT

A motor device is provided. The motor device includes a motor, a lead screw, a transmission mechanism and a housing. The transmission mechanism is configured to transmit rotation of the motor to the lead screw. The housing includes a housing outer wall to define a housing cavity and a partition to define a transmission cavity for accommodating the transmission mechanism. The transmission cavity is inside the housing cavity. The housing cavity also accommodates at least a portion of the lead screw. The partition includes a first protruding sidewall and a second protruding sidewall respectively on either side of the transmission cavity, and the transmission cavity is sealed for a lubricant that is used for the transmission mechanism and contained in the transmission cavity.

17 Claims, 5 Drawing Sheets

(56) References Cited

U.S. PATENT DOCUMENTS

| | | | | |
|---|---|---|---|---|
| 2016/0123444 A1* | 5/2016 | Riedinger | ............... | B60N 2/166 |
| | | | | 74/424.71 |
| 2016/0146317 A1* | 5/2016 | Tseng | ................... | F16C 19/545 |
| | | | | 74/89.37 |
| 2017/0307053 A1* | 10/2017 | Riester | ................... | B60N 2/067 |
| 2018/0031091 A1* | 2/2018 | Wu | ......................... | F16H 25/20 |
| 2018/0187759 A1* | 7/2018 | Smith | ................... | H02P 29/032 |
| 2018/0355958 A1* | 12/2018 | Graham | ................ | B60N 2/233 |
| 2019/0078670 A1* | 3/2019 | Lei | ...................... | F16H 25/2015 |
| 2019/0195324 A1* | 6/2019 | Ema | .................... | F16H 25/2204 |
| 2019/0234500 A1* | 8/2019 | Johnson | ................. | H02K 7/116 |

FOREIGN PATENT DOCUMENTS

| | | |
|---|---|---|
| CN | 206195544 U | 5/2017 |
| CN | 206294013 U | 6/2017 |

\* cited by examiner

MOTOR DEVICE WITH A LUBRICATION-SEALED TRANSMISSION CAVITY

The present application claims the priority of the Chinese Utility Model Patent No. 201821446701.8, filed Sep. 4, 2018, the entire disclosure of which is hereby incorporated by reference.

TECHNICAL FIELD

Embodiments of the present disclosure relate to a motor device.

BACKGROUND

Motor devices, in particular motor devices for driving objects into linear motion, can be used in furniture products. For example, the motor device can be mounted on a smart bed and a smart sofa. The motor device provides a more humane and comfortable function to the smart bed and smart sofa. For the smart bed and smart sofa bed as rest carriers, the quietness of rest environment is critical to the quality of people's rest. At present, a big problem in the motor device industry is the noise generated by the motor device during operating. Therefore, the noise level of the motor device is an important indicator to evaluate the performance of the product.

SUMMARY

A motor device is provided in accordance with at least one embodiment of the present disclosure. The motor device may comprise a motor, a lead screw, a transmission mechanism and a housing. The transmission mechanism is configured to transmit rotation from the motor to the lead screw. The housing can comprise a housing outer wall to define a housing cavity and a partition to define a transmission cavity for accommodating the transmission mechanism. The transmission cavity is inside the housing cavity. The housing cavity also accommodates at least a portion of the lead screw. The partition may comprise a first protruding sidewall and a second protruding sidewall respectively on either side of the transmission cavity, and the transmission cavity is sealed for a lubricant that is used for the transmission mechanism and contained in the transmission cavity.

For example, in some embodiments, the housing comprises a first half housing and a second half housing. The first half housing and the second half housings sealingly engages in a direction parallel to an axial direction of the lead screw to form the housing. The first half housing has a first sealing structure on an engagement surface of the first half housing surrounding the transmission cavity, and the second half housing has a second sealing structure that cooperates with the first sealing structure on an engagement surface of the second half housing surrounding the transmission cavity.

For example, in some embodiments, the first sealing structure is a reinforcing rib that protrudes perpendicular to the engagement surface of the first half housing to form a convex surface and is arranged surrounding the transmission cavity. The second sealing structure can be a groove that is recessed perpendicular to the engagement surface of the second half housing to form a concave surface and is arranged surrounding the transmission cavity, and the reinforcing rib is inserted into the groove.

For example, in some embodiments, the motor device further comprises a first bearing and a second bearing. The first bearing and the second bearing can be mounted to the lead screw to support the lead screw. The transmission cavity may be located between the first bearing and the second bearing. In one embodiment, a first bearing end surface of the outer ring of the first bearing that is close to the transmission cavity is adjacent to the first protruding sidewall, and a third bearing end surface of the outer ring of the second bearing that is close to the transmission cavity is adjacent to the second protruding sidewall.

For example, in some embodiments, the housing further comprises a third protruding sidewall and a fourth protruding sidewall. In one embodiment, a second bearing end surface of the outer ring of the first bearing facing away from the transmission cavity is adjacent to the third protruding sidewall, and a fourth bearing end surface of the outer ring of the second bearing facing away from the transmission cavity is adjacent to the fourth protruding sidewall.

For example, in some embodiments, the first bearing and the second bearing have the same specifications.

For example, in some embodiments, the third protruding sidewall and the fourth protruding sidewall protrude toward an inside of the housing to form a third center through hole and a fourth center through hole respectively, the third center through hole having a radius between an outer radius of an inner ring of the first bearing and an inner radius of the outer ring of the first bearing and closer to the outer radius of the inner ring of the first bearing, the fourth center through hole having a radius between an outer radius of an inner ring of the second bearing and an inner radius of the outer ring of the second bearing and closer to the outer radius of the inner ring of the second bearing.

For example, in some embodiments, the first bearing and the second bearing are both bearings with a dust proof cover.

For example, in some embodiments, the first protruding sidewall has a thickness that is smaller than that of the third protruding sidewall and the second protruding sidewall has a thickness that is smaller than that of the fourth protruding sidewall.

For example, in some embodiments, a first gap between the first bearing end surface of the outer ring of the first bearing and the first protruding sidewall has a first gap width, and a second gap between the third bearing end surface of the outer ring of the second bearing and the second protruding sidewall has a second gap width, a third gap between the second bearing end surface of the outer ring of the first bearing and the third protruding sidewall has a third gap width, a fourth gap between the fourth bearing end surface of the outer ring of the second bearing and the fourth protruding sidewall has a fourth gap width. In one embodiment, the first gap width is smaller than the fourth gap width, and the second gap width is smaller than the third gap width.

For example, in some embodiments, the transmission mechanism comprises a gear located between the first bearing and the second bearing and fixed to the lead screw coaxially with the lead screw.

For example, in some embodiments, the gear comprises a disc-shaped body portion and two cylindrical portions on opposite sides of the disc-shaped body portion. The first protruding sidewall and the second protruding sidewall protrude toward inside of the housing to form a first center through hole and a second center through hole respectively. The two cylindrical portions respectively pass through the first center through hole and the second center through hole to abut against the first bearing and the second bearing.

For example, in some embodiments, the first center through hole has a radius between an outer radius of a corresponding cylindrical portion and an inner radius of the outer ring of the first bearing and closer to the outer radius of the corresponding cylindrical portion. The second center through hole has a radius between an outer radius of a corresponding cylindrical portion and an inner radius of the outer ring of the second bearing and closer to the outer radius of the corresponding cylindrical portion.

For example, in some embodiments, the motor device further comprises a bearing fastening screw. The lead screw comprises a supported end portion to which the first bearing and the second bearing is mounted, the supported end portion comprising a tail end and a shoulder. The second bearing can be closer to the tail end than the first bearing. A fifth bearing end surface of an inner ring of the first bearing that faces away from the transmission cavity abuts against the shoulder. The bearing fastening screw is axially screwed into an end surface of the tail end, an end surface of a head of the bearing fastening screw axially presses an inner ring of the second bearing. A sum of a thickness of the first bearing, a thickness of the gear, and a thickness of the second bearing is not less than a distance between the shoulder and the tail end.

For example, in some embodiments, the motor device further comprises a nut. The lead screw comprises a supported end portion and a threaded end portion opposite to the supported end portion. The first bearing and the second bearing are mounted to the supported end portion. The nut is mounted to the threaded end portion, for outputting the rotation of the lead screw as a linear movement of the nut.

For example, in some embodiments, the first bearing and the second bearing are both deep groove ball bearings.

For example, in some embodiments, the transmission mechanism comprises a worm and a gear. The worm receives power from the motor to rotate, and the gear is coaxially fixed to the lead screw and meshed with the worm.

For example, in some embodiments, the lubricant is a grease lubricant.

For example, in some embodiments, the grease lubricant is an extreme pressure lithium-based grease.

For example, in some embodiments, the transmission cavity is adjacent to an edge of the housing cavity. The partition and a portion of the housing outer wall together define the transmission cavity.

BRIEF DESCRIPTION OF THE DRAWINGS

In order to clearly illustrate the technical solutions of the embodiments of the disclosure, the drawings of the embodiments will be briefly described in the following. It should be understood that the following drawings illustrate only certain embodiments of the present disclosure, and thus should not be construed as limiting the scope, and other relevant drawings may be obtained from these drawings.

DETAILED DESCRIPTION

Figure 1:
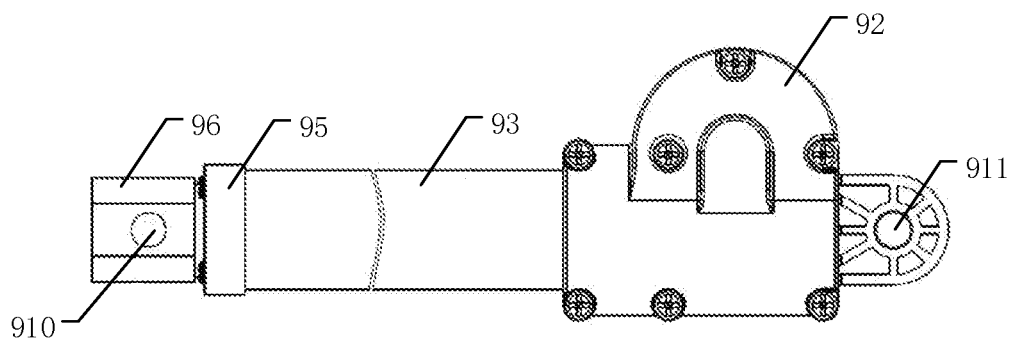
FIG. 1 is an external view of a motor device in accordance with one embodiment of the present invention.

In order to make objects, technical details and advantages of the embodiments of the disclosure apparent, the embodiments of the present invention will be described in detail below. It should be noted that, in the case of no conflict, the embodiments and the features in the embodiments in the present application may be arbitrarily combined with each other.

It should be understood that the singular forms "a" and "the" include plural referents unless the context clearly dictates otherwise. In the present disclosure, the term "comprising" and/or "having" is intended to mean the presence of the features, quantities, operations, elements and components disclosed in the application, or combinations thereof. Therefore, the terms "comprising" and/or "having" are understood to mean that there are additional possibilities of one or more other features, quantities, operations, elements and components, or combinations thereof.

Although the various elements of the present disclosure may be expressed using the terms "first" and "second", they are not intended to limit the corresponding elements. For example, the above expression is not intended to limit the order or importance of the corresponding elements. The above expression is used to distinguish one component from another.

When an element is referred to as "coupled" or "connected" to another element, this may mean that it is directly coupled or connected to the other element, but it should be understood that an intermediate element may be present. Alternatively, when an element is referred to as "directly coupled" or "directly connected" to another element, it is understood that there are no intermediate elements between the two elements.

The term set used in the present disclosure is for the purpose of describing particular embodiments, and is not intended to limit the disclosure. A singular expression includes a plural expression unless there is a significant difference in context and scheme between them.

All terms (including technical and scientific terms) used herein are intended to be understood in the ordinary meaning of the ordinary skill of the art, unless otherwise defined. It should also be understood that terms (such as those defined in commonly used dictionaries) should be interpreted as having meaning consistent with the relevant art and the context of the specification, and should not be interpreted in an idealized or overly formalized sense, unless explicitly defined as such herein.

Therefore, the detailed description of the disclosed embodiments provided with reference to the accompanying drawings hereinafter is not intended to limit the scope of the present disclosure claimed, but is merely representative of selected embodiments of the present disclosure. All other embodiments obtained by a person of ordinary skill in the art based on the embodiments of the present disclosure without departing from the inventive scope are within the scope of the disclosure.

As shown in FIGS. 1-4, the motor device includes a motor 1, a lead screw 6, a nut 7 cooperating with the lead screw 6, and a transmission mechanism for transmitting a rotation of the motor 1 to the lead screw 6. The transmission mechanism may include a worm 2 and a helical gear 3, but the disclosure is not limited thereto. In addition, the motor device further includes a first bearing 4, a second bearing 5, a bearing fastening screw 8 and a housing accommodating the worm 2, the helical gear 3, the first bearing 4, the second bearing 5, the lead screw 6, the nut 7, and the bearing fastening screw 8.

Figure 3:
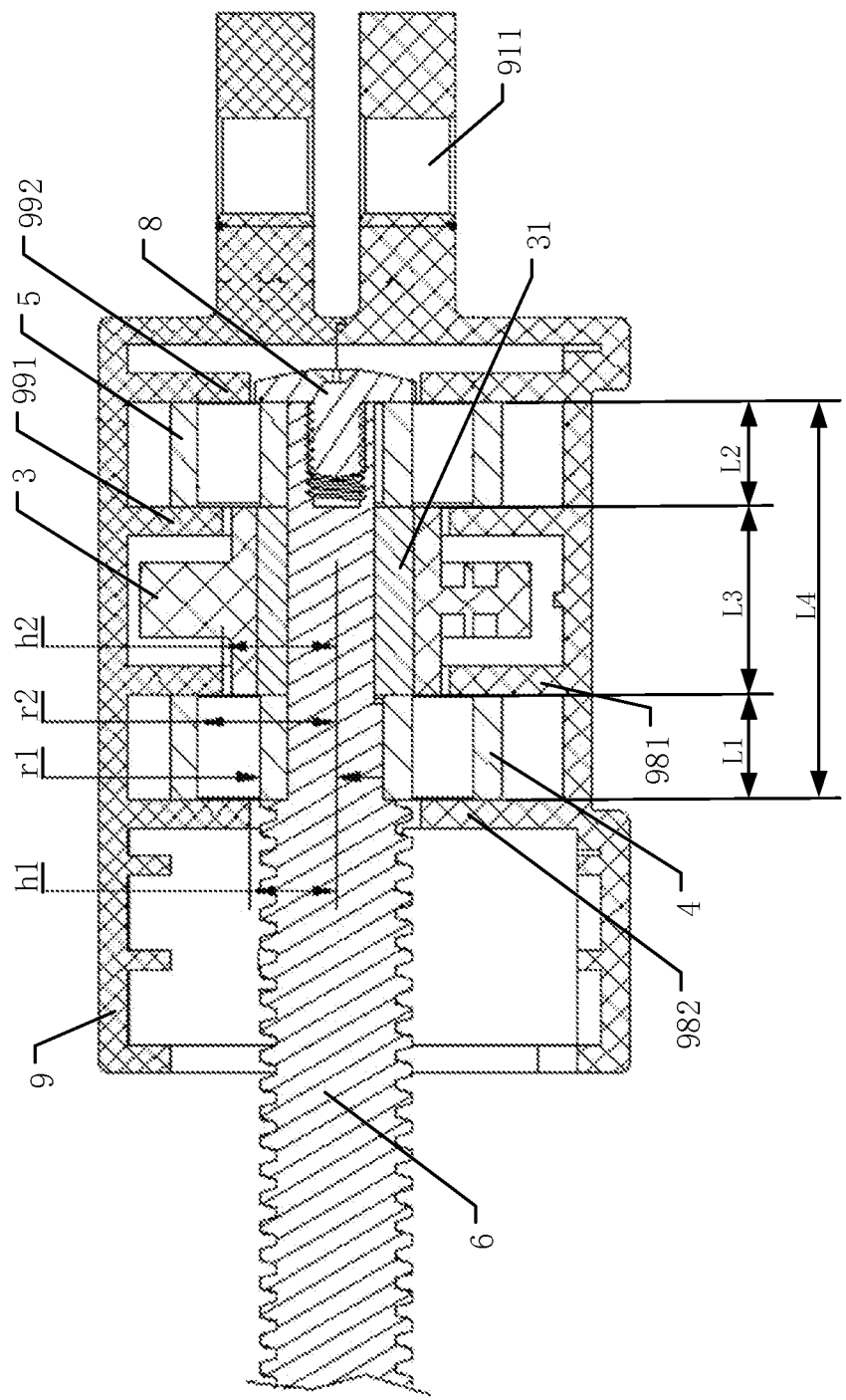
FIG. 3 is a longitudinal cross-sectional view of a motor device in accordance with one embodiment of the present invention.
Figure 4:
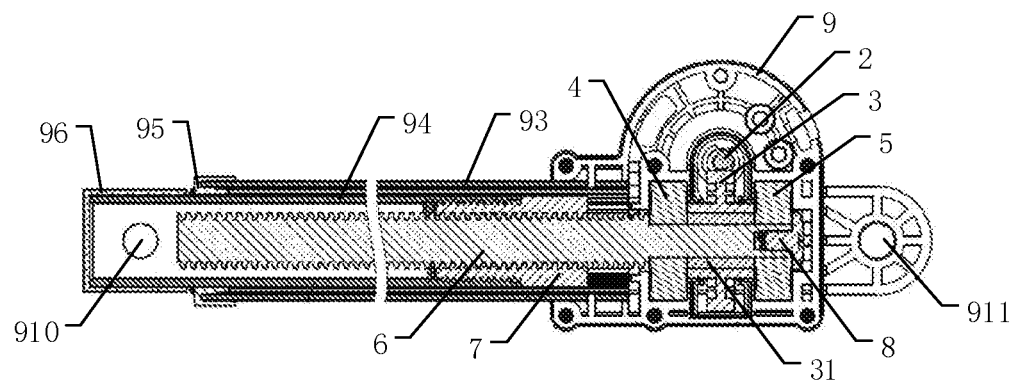
FIG. 4 is another longitudinal cross-sectional view of a motor device in accordance with one embodiment of the present invention.

As shown in FIGS. 1 and 4, the housing 9 includes a housing body, a first cylindrical tube 93, a first cylindrical tube cover 95, a second cylindrical tube 94, and a second cylindrical tube cover 96. As illustrated, the housing body includes a first half housing 91 and a second half housing 92. The first half case 91 and the second half case 92 can be engaged at an engagement surface parallel to an axial direction of the lead screw 6. For example, the first half housing 91 and the second half housing 92 may be fixed to each other by screws. FIG. 4 is a longitudinal cross-sectional view of the motor device taken along the engagement surface of the first half housing 91 and the second half housing 92, and FIG. 3 is a longitudinal cross-sectional view of the motor device taken along a plane perpendicular to the engagement surface that passes through the lead screw 6. Here, the "longitudinal cross-sectional view" refers to a cross-sectional view taken along a plane parallel to a central axis of the lead screw 6.

Figure 2:
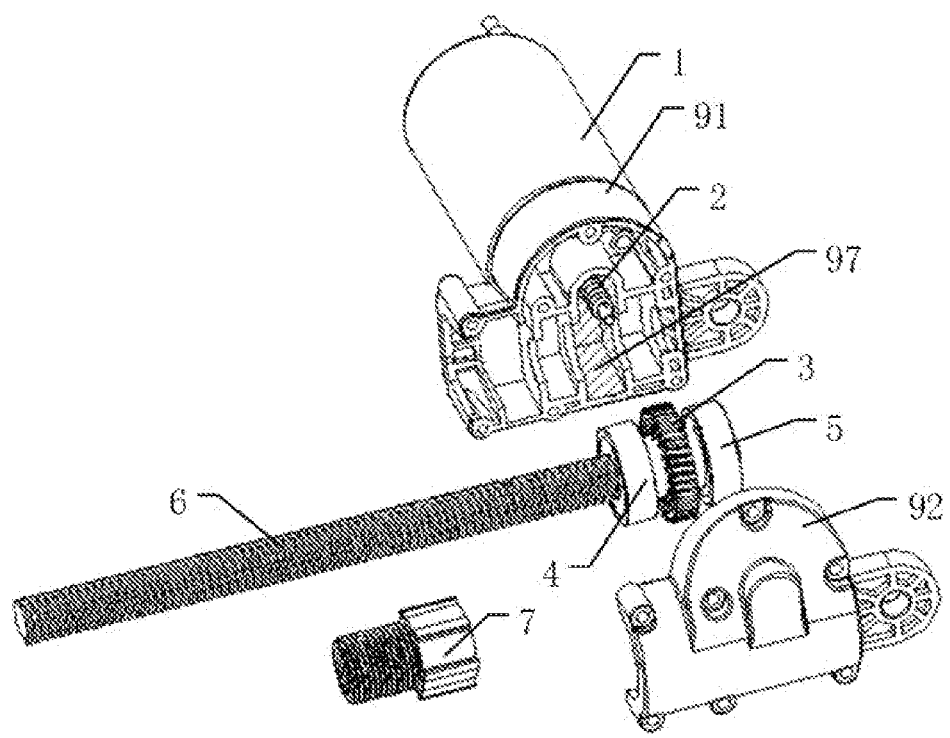
FIG. 2 is an exploded perspective view of a motor device in accordance with one embodiment of the present invention.

As shown in FIG. 2, the motor 1 is disposed on a side where the first half housing 91 is located, and an output shaft of the motor 1 is configured with worm type tooth to form the worm 2. The worm 2 extends from the motor shaft through hole 973 (see FIG. 5) of the first half housing 91 into a transmission cavity 97 (an obliquely hatched portion in FIG. 2) to mesh with the helical gear 3 in the transmission cavity 97, thereby converting a rotation of the output shaft of the motor 1 into a rotation of the helical gear 3. The helical gear 3 may also be substituted as a worm gear. In one embodiment, the helical gear 3 is used to reduce the cost of the motor device. The helical gear 3 forms an angle with respect to a rotational axis of the worm 2. In this embodiment, the angle is a right angle. In one embodiment, the output shaft of the motor 1 is configured with worm type tooth, that is, the output shaft of the motor is integrally formed with the worm 2. Alternatively, the output shaft of the motor 1 may also be a separate component from the worm 2 to which the worm 2 is fixed. Alternatively, the output shaft of the motor 1 may be connected to the worm 2 via other transmission components.

The helical gear 3 is fixed coaxially to the lead screw 6, and the helical gear 3 receives power from the worm 2 to drive the lead screw 6 to rotate with the helical gear 3.

The first bearing 4 and the second bearing 5 are separately provided at the supported end portion of the lead screw 6. The supported end portion includes a tail end and a shoulder. The second bearing 5 can be closer to the tail end of the supported end portion of the lead screw 6. The helical gear 3 may be disposed between the first bearing 4 and the second bearing 5. The bearing fastening screw 8 can be axially screwed into the end surface of the tail end of the lead screw 6, and the end surface of a head of the bearing fastening screw 8 axially presses a sixth bearing end surface of an inner ring of the second bearing 5 facing away from the transmission cavity, thereby pressing tightly the second bearing 5, the helical gear 3, and the first bearing 4 against the shoulder of the lead screw 6 in an axial direction.

Specifically, a fifth bearing end surface of an inner ring of the first bearing 4 may abut against the shoulder of the lead screw 6. In one embodiment, a sum of a thickness L1 of the first bearing 4, a thickness L3 of the helical gear 3, and a thickness L2 of the second bearing 5 is not less than a distance L4 between the shoulder and the end surface of the tail end of the lead screw 6. In this way, it can be ensured that the end surface of the head of the bearing fastening screw 8 axially press the inner ring of the second bearing 5, thereby ensuring the assembly accuracy of the motor device. Thread glue may be applied to the threaded joint of the fastening screw 8 and the lead screw 6 to prevent the fastening screw 8 from being loosened by thrust or tension or the like. The thickness L1 of the first bearing 4, the thickness L3 of the helical gear 3, and the thickness L2 of the second bearing 5 being not less than the distance L4 between the shoulder and the end surface of the tail end of the lead screw 6 means, in terms of the dimensional chain, the sum of the thickness L1 of the first bearing 4, the thickness L3 of the helical gear 3, and the thickness L2 of the second bearing 5 is not less than the maximum value of the distance L4 between the shoulder and the end surface of tail end of the lead screw 6 considering tolerance.

The supported end portion of the lead screw 6 connecting the first bearing 4, the second bearing 5 and the helical gear 3 can have a constant outer diameter. Therefore, it is not necessary to machine additional shoulders, making the processing of the lead screw 6 simpler and less expensive, and also improving the coaxial precision of the first bearing 4, the helical gear 3, the second bearing 5, and the lead screw 6. The first bearing 4 and the second bearing 5 may be designed to have same specifications, that is, they belong to same bearing type and have same size. In order to make the helical gear 3 having an inner diameter different from the outer diameter of the lead screw 6 fit with the lead screw 6, the helical gear 3 is provided with a helical gear spline insert 31 that is fixed to the inner side of a shaft hole of the helical gear 3 to reduce an inner diameter of the helical gear 3. The insert 31 is coaxially fixed to the lead screw 6 via the helical gear spline insert 31.

The nut 7 is mounted to a threaded end portion of the lead screw 6 opposite the supported end portion for outputting the rotational motion of the lead screw 6 as a linear motion of the nut 7. Specifically, an internal thread of the nut 7 meshes with an external thread of the lead screw 6. In one embodiment, the nut 7 cannot rotate relative to the housing but can slide relative to the housing.

The first cylindrical tube 93 and the second cylindrical tube 94 constitute a telescopic structure. The first cylindrical tube 93 and the second cylindrical tube 94 are both elongated tubular shapes. The second cylindrical tube 94 is in sleeve joint with the first cylindrical tube 93 such that the second cylindrical tube 94 is slidable relative to the first cylindrical tube 93. Specifically, the second round tube 94 is sleeved inside the first round tube 93. The first cylindrical tube 93 is connected to and extends from the housing body. A guide rib is disposed in an inner wall of the first cylindrical tube 93, extending axially, and the guide rib cooperates with the nut 7 so that the nut 7 cannot rotate relative to the first cylindrical tube 93. The second cylindrical tube 94 is fixed to the nut 7, for example, by providing a fastening thread inside the second cylindrical tube 94 and an external thread of the nut 7. The second cylindrical tube cover 96 covers an opening end of the second cylindrical tube 94 away from the housing body, and the first cylindrical tube cover 95 covers an opening end of the first cylindrical tube 93 away from the housing body. The first cylindrical tube cover 95 has a center through hole, and the second round tube 94 extends from outside of the first cylindrical tube 93 toward the housing body through the center through hole to be fixed to the nut 7. Thus, the first cylindrical tube 93, the first cylindrical tube cover 95, the second cylindrical tube 94, and the second cylindrical tube cover 96 constitute a screw receiving cavity that accommodates most of the threaded portion of the lead screw 6, and the lead screw receiving cavity has a length that is variable in the axial direction of the lead screw 6. For example, a sealing structure is provided between the second cylindrical tube 94 and the center through hole of the first cylindrical tube cover 95.

An end of the second cylindrical tube 94 away from the housing body may be provided with a first pin hole 910 by which an external object is connected to the motor device such that the motor device drives the external object to perform a linear motion. Further, an end of the housing body facing away from the second cylindrical tube 94 may be provided with a second pin hole 911 by which another external object is connected to the motor device. For example, a line connecting the first pin hole 910 and the second pin hole 911 may pass through the axis of the lead screw 6. The external object and the other external object described above can perform relative linear motion.

In other embodiments, the motor device may have other configurations or cooperate with other structures to convert and output the rotational motion of the lead screw 6 into a linear motion, and the disclosure is not limited thereto.

The motor arrangement according to the present disclosure is capable of carrying axial thrust and is also capable of carrying axial tension. When the motor device is subjected to the axial thrust, the axial thrust is substantially successively transmitted through the second cylindrical tube 94, the nut 7, the lead screw 6, the first bearing 4, the helical gear 3, the second bearing 5, and then to the housing via the first bearing 4 and the second bearings 5. When the motor device is subjected to the axial tension, the axial tension is substantially successively transmitted through the second cylindrical tube 94, the nut 7, the lead screw 6, the bearing fastening screw 8, the second bearing 5, the helical gear 3, the first bearing 4, and then to the housing via the first bearing 4 and the second bearings 5.

Figure 5:
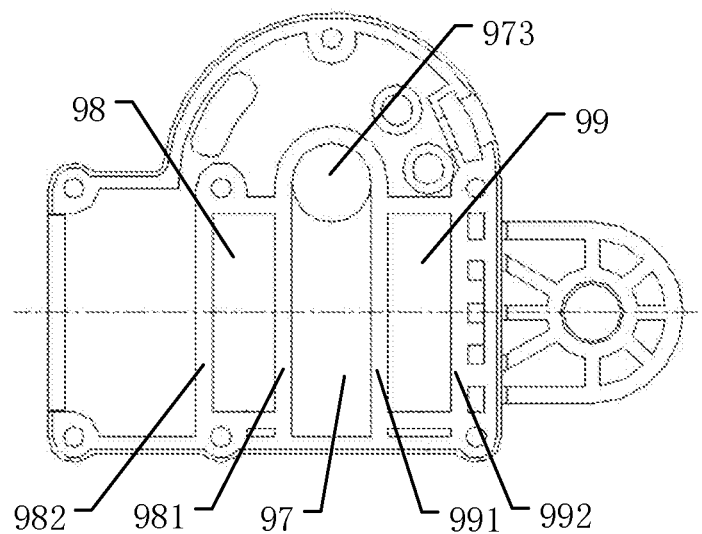
FIG. 5 is a front view of a first half housing in accordance with one embodiment of the present invention.

FIG. 5 is a front view of a first half housing 91 in accordance with an embodiment of the present disclosure.

Referring to FIGS. 4-5, the housing body includes a housing outer wall defining a housing cavity and a partition defining a transmission cavity 97 for accommodating the transmission mechanism. The transmission cavity 97 is inside the housing outer wall. The partition includes a first protruding sidewall 981, a second protruding sidewall 991, and a curved wall that surrounds the worm 2. In the present example, the transmission cavity 97 is adjacent an edge of the housing cavity, and the first protruding sidewall 981, the second protruding sidewall 991, the curved wall, and a portion of the housing outer wall together define the transmission cavity 97. Therefore, the space in the housing cavity can be utilized more effectively. In addition, the housing further includes a third protruding sidewall 982 and a fourth protruding sidewall 992.

As shown in FIGS. 2-4, the first half housing 91 and the second half housing 92 engage along an engagement surface that is parallel to the axis of the lead screw 6 to collectively form the housing body. The first protruding sidewall 981 and the third protruding sidewall 982 form two opposite sidewalls of the first bearing receiving cavity 98, and the second protruding sidewall 991 and the fourth protruding sidewall 992 form two opposite sidewalls of the second bearing receiving cavity 99. The first bearing receiving cavity 98 is used to accommodate the first bearing 4, and the second bearing receiving cavity 99 is used to accommodate the second bearing 5. A first bearing end surface of an outer ring of the first bearing 4 close to the helical gear 3 is adjacent to the first protruding sidewall 981, a second bearing end surface of the outer ring of the first bearing 4 facing away from the helical gear 3 is adjacent to the third protruding sidewall 982, a third bearing end surface of an outer ring of the second bearing 5 close to the helical gear 3 is adjacent to the second protruding sidewall 991, and a fourth bearing end surface of the outer ring of the second bearing 5 facing away from the helical gear 3 is adjacent to the fourth protruding sidewall 992. Here, two components "adjacent" mean that there are no other components between the two components, but there can be a gap between the two components. For example, the gap may be caused by assembly tolerances.

In one embodiment, the engagement surface of the first half housing 91 and the second half housing 92 passes through the axis of the lead screw 6, and the first half housing 91 and the second half housing 92 are disposed substantially symmetrically. However, the present disclosure is not limited thereto, and the volume of the first half housing 91 may be larger than the volume of the second half housing 92, or the volume of the first half housing 91 may be smaller than the volume of the second half housing 92.

The transmission cavity 97 is used to accommodate the transmission mechanism including the worm 2 and the helical gear 3. Further, the transmission cavity 97 is also filled with a lubricant to lubricate the meshing transmission between the worm 2 and the helical gear 3. For example, the transmission cavity 97 may be substantially completely filled with the lubricant or filled with the lubricant as needed. The transmission cavity 97 is sealed to the lubricant contained therein.

Figure 6:
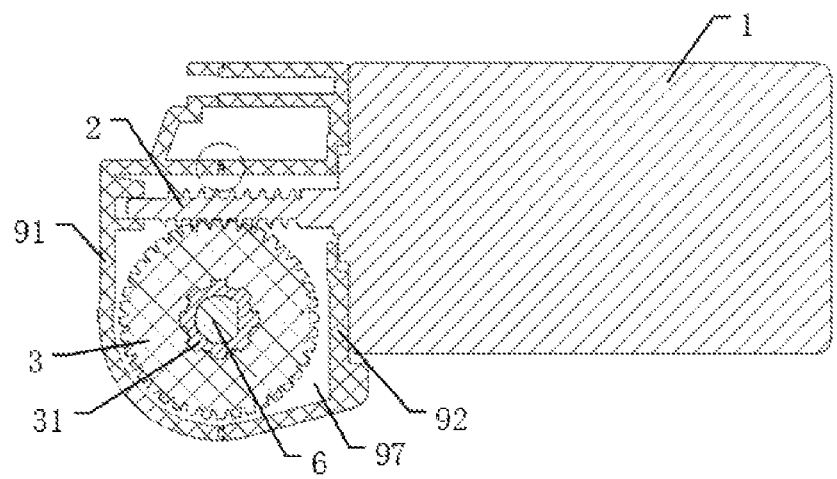
FIG. 6 is a transverse cross-sectional view of a motor device in accordance with one embodiment of the present invention.
Figure 7:
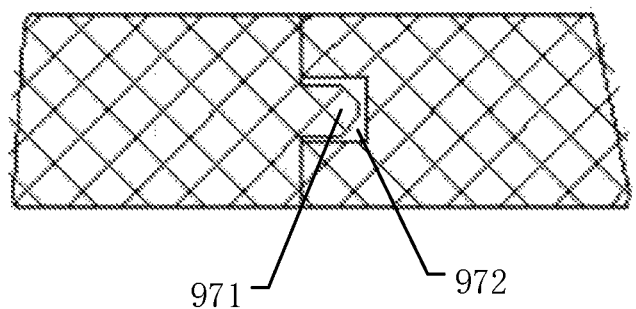
FIG. 7 is an enlarged view of the circled portion of FIG. 6.

FIG. 6 is a transverse cross-sectional view of a motor device in accordance with an embodiment of the present disclosure. FIG. 7 is an enlarged view of the circled portion of FIG. 6. Here, the "transverse cross-sectional view" refers to a cross-sectional view taken along a plane perpendicular to the central axis of the lead screw 6. As shown in FIGS. 6 and 7, in order to better seal the transmission cavity 97, the first half housing 91 and the second half housing 92 are engaged by a projection-recessed structure around the transmission cavity 97. In the present example, the first half housing 91 and the second half housing 92 engage with each other via a projection-recessed structure at the first protruding sidewall 981, the second protruding sidewall 991, the curved wall, and a portion of the housing outer wall surrounding the transmission cavity 97. At the engagement surface of the first half housing 91 around the transmission cavity 97, a reinforcing rib 971 can be provided, projecting perpendicularly to the engagement surface to form a convex surface and arranged around the transmission cavity 97. At the engagement surface of second half housing 92 around the transmission cavity 97, a recess 972 may be provided, recessed perpendicular to the engagement surface to form a concave surface and arranged around the transmission cavity 97. The reinforcing rib 971 can be inserted into the recess 972. Thus, the engagement by the projection-recessed structure can achieve a good seal and is simple in structure, so that the engagement between the first half housing 91 and the second half housing 92 is convenient.

Specifically, the portion of the first half housing 91 surrounding the transmission cavity 97 includes a portion of the first protruding sidewall 981 and a portion of the second protruding sidewall 991, and the portion of the second half housing 92 surrounding the transmission cavity 97 includes another portion of the first protruding sidewall 981 and another portion of the second protruding sidewall 991. A portion of the rib 971 is disposed on an engagement surface of the portion of the first protruding sidewall 981, and another portion of the rib 971 is disposed on an engagement surface of the portion of the second protruding sidewall 991. Similarly, a portion of the groove 972 is disposed on an engagement surface of another portion of the first protruding sidewall 981, and another portion of the groove 972 is provided on the engagement surface of the another portion of the second protruding sidewall 991. Further, in particular, because the transmission cavity 97 has a first center through hole and a second center through hole (which will be described later in detail) through which the lead screw 6 and the helical gear 3 pass, the reinforcing rib 971 includes a first segment reinforcing rib and a second segment reinforcing rib and the groove 972 includes a first segment groove and a second segment groove.

The reinforcing rib 971 and the groove 972 that cooperate with each other can increase the overall deformation resistance of the housing body. Therefore, the deformation of the housing body may be reduced, thereby reducing noise due to poor meshing of the worm 2 and the helical gear 3.

Further, in one embodiment, a sealing structure or a sealing member may be provided at the motor shaft through hole 973 to achieve sealing. For example, the motor shaft through hole 973 may be covered by an end surface of the motor or an additional cover and pressing the end surface of the motor or the additional cover against the end surface of the housing around the periphery of the motor shaft through hole 973. Further, an element such as a seal ring may be provided.

In addition, the first bearing 4 and the second bearing 5 may be selected as bearings with a dust proof cover, in order to achieve a better sealing of the transmission cavity 97.

Since the transmission cavity 97 inside the housing cavity is sealed, the loss of lubricant in the transmission cavity 97 is avoided, and the lubricant in the transmission cavity 97 can lubricate the worm 2 and the helical gear 3 in the case of long-term operation or long-term idle condition. For example, the lubricant is a grease lubricant such as an extreme pressure lithium-based grease. The extreme pressure lithium-based grease has a high viscosity and can be better sealed in the transmission cavity 97. Furthermore, the grease lubricant maintained for a long time can improve the life of the components of the motor device, reduce the wear of the components, and further reduce the meshing noise between the components. In addition, sufficient grease lubricant may be injected into the transmission cavity 97, so that noise fluctuations caused by manufacturing errors and assembly errors of the components can be suppressed.

Figure 8:
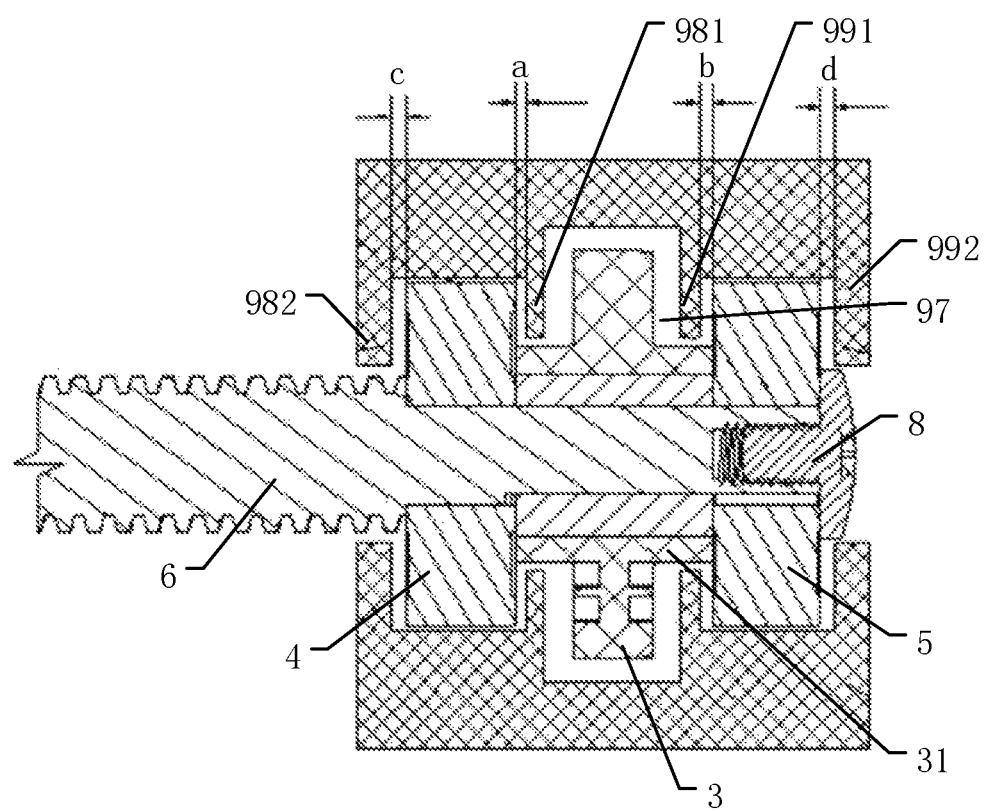
FIG. 8 is a schematic partial longitudinal cross-sectional view of a motor device in accordance with one embodiment of the present invention.

FIG. 8 is a schematic partial longitudinal cross-sectional view of a motor device in accordance with one embodiment of the present invention. As shown in FIG. 8, there are a first gap a between the first protruding sidewall 981 and the outer ring of the first bearing 4, a third gap c between the third protruding sidewall 982 and the outer ring of the first bearing 4, a second gap b between the second protruding sidewall 991 and the outer ring of the second bearing 5 and a fourth gap d between the fourth protruding sidewall 992 and the outer ring of the second bearing 5. The first gap width, the second gap width, the third gap width, and the fourth gap width of the first gap a, the second gap b, the third gap c, and the fourth gap d, respectively, may be positive or negative, which may be caused by assembly tolerances. For example, for an interference fit, the gap width can be negative, and for a gap fit, the gap width can be positive. FIG. 8 shows the first gap a, the second gap b, the third gap c, the fourth gap d only schematically, which are not drawn to scale.

The first gap a between the first protruding sidewall 981 and the outer ring of the first bearing 4 and the second gap b between the second protruding sidewall 991 and the outer ring of the second bearing 5 are disposed such that the transmission cavity 97 is sealed to the lubricant accommodated in the transmission cavity 97.

In one embodiment, the housing 9, the helical gear 3, the first bearing 4, and the second bearing 5 are sized such that the first gap width of the first gap a is smaller than the fourth gap width of the fourth gap d, and the second gap of the second gap b is smaller than the third gap width of the third gap c. Further, the first gap width may be substantially equal to the second gap width, and the third gap width may be substantially equal to the fourth gap width.

For example, the thickness of the first protruding sidewall 981 may be smaller than the thickness of the third protruding sidewall 982, and the thickness of the second protruding sidewall 991 may be smaller than the thickness of the fourth protruding sidewall 992. In the case where the available space between the first bearing 4 and the second bearing 5 is small, space can be saved.

The rigidity of each of the protruding sidewalls is proportional to its thickness, and therefore, the first protruding sidewall 981 is more intend to deform than the third protruding sidewall 982, and the second protruding sidewall 991 is more intend to deform than the fourth protruding sidewall 992.

In the case where the motor device is subjected to axial thrust, since the first gap width of the first gap a is smaller than the fourth gap width of the fourth gap d, the first bearing 4 is first axially pressed against the first protruding sidewall 981, and as the axial thrust increases, the first protruding sidewall 981 is microscopically deformed until the second bearing 5 starts to press against the fourth protruding sidewall 992. Therefore, the first bearing 4 is first pressed against the first protruding sidewall 981 to carry a small thrust; as the thrust increases, the second bearing 5 begins to be pressed against the fourth protruding sidewall 992 that has a greater rigidity than that of the first protruding sidewall 981, thereby carrying a large thrust together with the first bearing 4. Thus, the first bearing 4 and the second bearing 5 begin to collectively carry the axial thrust when the axial thrust has a smaller value, compared to the case where the first gap width is greater than the fourth gap width. In the case where the first gap width is greater than the fourth gap width, the first bearing 4 needs to carry a greater force to deform the first protruding sidewall 981 so as to carry the thrust force together with the second bearing 5.

In the case where the motor device is subjected to axial tension, since the second gap width of the second gap b is smaller than the third gap width of the third gap c, the second bearing 5 is first axially pressed against the second protruding sidewall 991, and as the axial tension increases, the second protruding sidewall 991 is microscopically deformed until the first bearing 4 starts to press against the third protruding sidewall 982. Therefore, the second bearing 5 is first pressed against the second protruding sidewall 991 to carry a small pressure, and as the pressure increases, the first bearing 4 begins to be pressed against the third protrusion wall 982 that has a greater rigidity than that of the second protruding sidewall 991, thereby carrying a large tension together with the second bearing 5. Thus, the first bearing 4 and the second bearing 5 begin to collectively carry the axial tension when the axial tension has a smaller value, compared to the case where the second gap width is greater than the third gap width.

Therefore, the first bearing 4 and the second bearing 5 are respectively main bearings under different conditions, and the requirements for the bearing capacity of the first bearing 4 and the second bearing 5 can be substantially the same.

As described above, the first bearing 4 and the second bearing 5 can have the same specifications.

Since the first bearing 4 and the second bearing 5 are respectively main bearings under different conditions, and the requirement for the bearing capacities of the first bearing 4 and the second bearing 5 may be substantially the same, the first bearing 4 and the second bearing 5 are designed to have same specifications to improve the overall bearing efficiency of the bearings and reduce the overall cost of the bearings.

Further, since the first bearing 4 and the second bearing 5 can have the same specifications, the first bearing 4 and the second bearing 5 can have the same inner diameters of the same inner rings. For example, if the inner diameter of the inner ring of the first bearing 4 is smaller than the inner diameter of the inner ring of the second bearing 5, the diameter of the supported end portion of the screw 6 should correspond to the inner diameter of the inner ring of the first bearing 4. In this case, the second bearing 5 needs to be provided with an insert embedded inside its inner ring to be mounted to the supported end portion of the lead screw 6. Due to the addition of parts such as inserts, the assembly dimensional error increases and the concentricity of the first bearing 4 and the second bearing 5 decreases. For example, if the inner diameter of the inner ring of the first bearing 4 is larger than the inner diameter of the inner ring of the second bearing 5, the diameter of the supported end portion of the screw 6 may correspond to the inner diameter of the inner ring of the second bearing 5. In this case, the first bearing 4 needs to be provided with an insert, or the lead screw 6 may be provided with an additional shoulder, causing the processing cost of the lead screw 6 increased and the concentricity of the lead screw 6, the first bearing 4 and the second bearing 5 reduced. Therefore, the first bearing 4 and the second bearing 5 have the same specifications advantageously improve the assembly accuracy and reduce the cost of the motor device.

As shown in FIG. 3, the first protruding sidewall 981, the second protruding sidewall 991, the third protruding sidewall 982, and the fourth protruding sidewall 992 extend toward the inside of the housing body in the radial direction of the lead screw 6, respectively, forming a first center through hole, a second center through hole, a third center through hole, and a fourth center through hole. The first center through hole, the second center through hole, the third center through hole, and the fourth center through hole is substantially coaxial with the lead screw. The helical gear 3 has a disk-shaped body portion with teeth and two cylindrical portions on both sides of the disk-shaped body portion. The two cylindrical portions of the helical gear 3 extend axially through the first center through hole and the second center through hole, respectively, to abut against the first bearing 4 and the second bearing 5. A radius h2 of the first center through hole is between an outer radius of one cylindrical portion of the helical gear 3 and an inner radius r2 of the outer ring of the first bearing 4, and is closer to the outer radius of the one cylindrical portion of the helical gear 3; a radius of the second center through hole is between an outer radius of the other cylindrical portion of the helical gear 3 and an inner radius of the outer ring of the second bearing 5, and closer to the outer radius of the other cylindrical portion of the helical gear 3; a radius h1 of the third center through hole is between an inner radius r1 of the inner ring of the first bearing 4 and the inner radius r2 of the outer ring of the first bearing 4 and is closer to outer radius r1 of the inner ring; a radius of the fourth center through hole is between an outer radius of the outer ring of the second bearing 5 and the inner radius of the outer ring of the second bearing, and is closer to the outer radius of the inner ring. Therefore, the first protruding sidewall 981, the second protruding sidewall 991, the third protruding sidewall 982, and the fourth protruding sidewall 992 are designed to be as close as possible to the inner ring of the corresponding bearing.

In one embodiment, the disk-shaped body portion and the two cylindrical portions of the helical gear 3 are integrally formed. In other embodiments, the disc-shaped body portion and the two cylindrical portions may be separate from each other.

It will be understood by those skilled in the art that although defined herein by the radius, the first center through hole and the second center through hole are not limited to a completely circular shape, which allows variation as needed or machining error, as long as the inner wall surfaces of the first protruding sidewall 981 and the second protruding sidewall 991 that is projecting toward the inside of the housing 9 are closer to the corresponding cylindrical portion of the gear than the outer ring of the respective bearing 4, 5, while the outer ring of the first bearing 4 is adjacent to the first protruding sidewall 981 and the outer ring of the second bearing 5 is adjacent to the second protruding sidewall 991. Similarly, it will be understood by those skilled in the art that the third center through hole and the fourth center through hole are not limited to a completely circular shape, which allows variation as needed or machining error, as long as the inner wall surfaces of the third protruding sidewall 982 and the fourth protruding sidewall 992 that is projecting toward the inside of the housing 9 are closer to the inner ring of the respective bearing 4, 5 than the outer ring of the respective bearing 4, 5, while the outer ring of the first bearing 4 is adjacent to the third protruding sidewall 982 and the outer ring of the second bearing 5 is adjacent to the fourth protruding sidewall 992.

In some embodiments, there may be no cylindrical portion. In some embodiments, the transmission mechanism can include a plurality of gears. For example, the plurality of gears may be disposed in the transmission cavity 97 and disposed between the first bearing 4 and the second bearing 5.

The first bearing 4 and the second bearing 5 may employ deep groove ball bearings and have a dust seal cover. Because the first protruding sidewall 981, the second protruding sidewall 991, the third protruding sidewall 982, and the fourth protruding sidewall 992 are designed to be as close as possible to the inner ring of the respective bearing 4, 5, it is possible to limit the displacement of the balls in the respective bearings 4, 5, reducing the damage of the bearings 4, 5 caused by sudden impacts (for example, impacts due to accidental drops during production and transportation), thereby reducing noise due to the damage of the bearings 4, 5. Specifically, when the deep groove ball bearing carries the axial load, the load is first transmitted to the inner ring of the bearing, then transmitted to the outer ring of the bearing via the balls, and finally transmitted to the housing. During this process, since the balls are formed in the raceway and the inner ring and outer ring are relatively rigid, the balls are displaced by a microscopic distance so that the load is transmitted from the inner ring to the outer ring via the balls. However, when an impact load is applied, the damage of the inner ring, the outer ring, the raceway formed by the inner ring and the outer ring and the balls caused by the impact load is severer than the damage caused by the static load, so it is necessary to avoid the displacement between the balls and the inner ring. The first protruding sidewall 981, the second protruding sidewall 991, the third protruding sidewall 982, and the fourth protruding sidewall 992 are designed to be as close as possible to the inner ring of 4, 5, which is advantageous for reducing the damage to the bearing 4, 5 caused by the impact load.

In an example according to an embodiment of the present disclosure, the first bearing 4 and the second bearing 5 are TYPE 6300 bearings (Chinese National Standard, GB), the inner ring has an outer diameter of about 16 mm, the outer ring has an inner diameter of about 29 mm, and the first center through hole and the second center through hole has a diameter of about 24 mm, and the third center through hole and the fourth center through hole have a diameter of about 18 mm.

What have been described above are only specific implementations of the present disclosure, the protection scope of the present disclosure is not limited thereto, and the protection scope of the present disclosure should be based on the protection scope of the claims.

What is claimed is:

1. A motor device, comprising:
   a motor;
   a lead screw;
   a transmission mechanism, configured to transmit rotation from the motor to the lead screw; and
   a housing, comprising a housing outer wall that defines a housing cavity and a partition that defines a transmission cavity for accommodating the transmission mechanism;
   a first bearing and a second bearing, mounted to the lead screw to support the lead screw,
   wherein the transmission cavity is inside the housing cavity, between the first bearing and the second bearing,
   the housing cavity further accommodates at least a portion of the lead screw,
   the partition comprises a first protruding sidewall and a second protruding sidewall respectively on either side of the transmission cavity, wherein a first bearing end surface of the outer ring of the first bearing close to the transmission cavity is adjacent to the first protruding sidewall, and a third bearing end surface of the outer ring of the second bearing close to the transmission cavity is adjacent to the second protruding sidewall, and
   the transmission cavity is sealed for a lubricant that is used for the transmission mechanism and contained in the transmission cavity;
   the housing further comprises a third protruding sidewall and a fourth protruding sidewall,
   a second bearing end surface of the outer ring of the first bearing facing away from the transmission cavity is adjacent to the third protruding sidewall, and a fourth bearing end surface of the outer ring of the second bearing facing away from the transmission cavity is adjacent to the fourth protruding sidewalk;
   the first protruding sidewall has a thickness that is smaller than that of the third protruding sidewall and the second protruding sidewall has a thickness that is smaller than that of the fourth protruding sidewall.

2. The motor device according to claim 1, wherein
   the housing comprises a first half housing and a second half housing, the first half housing and the second half housings sealingly engaging with each other in a direction parallel to an axial direction of the lead screw to form the housing, and
   the first half housing has a first sealing structure on an engagement surface of the first half housing surrounding the transmission cavity, and the second half housing has a second sealing structure that cooperates with the first sealing structure on an engagement surface of the second half housing surrounding the transmission cavity.

3. The motor device according to claim 2, wherein
   the first sealing structure is a reinforcing rib that protrudes perpendicular to the engagement surface of the first half housing to form a convex surface and is arranged surrounding the transmission cavity, the second sealing structure is a groove that is recessed perpendicular to the engagement surface of the second half housing to form a concave surface and is arranged surrounding the transmission cavity, and the reinforcing rib is inserted into the groove.

4. The motor device according to claim 1, wherein
   the first bearing and the second bearing have same specifications.

5. The motor device according to claim 1, wherein
   the third protruding sidewall and the fourth protruding sidewall protrude toward an inside of the housing to form a third center through hole and a fourth center through hole respectively,
   the third center through hole has a radius between an outer radius of an inner ring of the first bearing and an inner radius of the outer ring of the first bearing and closer to the outer radius of the inner ring of the first bearing as compared with the inner radius of the outer ring of the first bearing, and
   the fourth center through hole has a radius between an outer radius of an inner ring of the second bearing and an inner radius of the outer ring of the second bearing and closer to the outer radius of the inner ring of the second bearing as compared with the inner radius of the outer ring of the second bearing.

6. The motor device according to claim 5, wherein
   the first bearing and the second bearing are both bearings with a dust proof cover.

7. The motor device according to claim 1, wherein
   the transmission mechanism comprises a gear located between the first bearing and the second bearing and fixed to the lead screw coaxially with the lead screw.

8. The motor device according to claim 7, wherein
   the gear comprises a disc-shaped body portion and two cylindrical portions on opposite sides of the disc-shaped body portion, and
   the first protruding sidewall and the second protruding sidewall protrude toward inside of the housing to form a first center through hole and a second center through hole respectively, the two cylindrical portions passing through the first center through hole and the second center through hole respectively to abut against the first bearing and the second bearing.

9. The motor device according to claim 8, wherein
   the first center through hole having a radius between an outer radius of a corresponding cylindrical portion and an inner radius of the outer ring of the first bearing and closer to the outer radius of the corresponding cylindrical portion, the second center through hole having a radius between an outer radius of a corresponding cylindrical portion and an inner radius of the outer ring of the second bearing and closer to the outer radius of the corresponding cylindrical portion.

10. The motor device according to claim 7, further comprising:
a bearing fastening screw; wherein
the lead screw comprises a supported end portion to which the first bearing and the second bearing is mounted, the supported end portion comprising an tail end and a shoulder,
the second bearing is closer to the tail end than the first bearing, and a fifth bearing end surface of an inner ring of the first bearing facing away from the transmission cavity abuts against the shoulder,
the bearing fastening screw is axially screwed into an end surface of the tail end, an end surface of a head of the bearing fastening screw axially presses an inner ring of the second bearing, and
a sum of a thickness of the first bearing, a thickness of the gear, and a thickness of the second bearing is not less than a distance between the shoulder and the tail end.

11. The motor device according to claim 1, further comprising:
a nut; wherein
the lead screw comprises a supported end portion and a threaded end portion opposite to the supported end portion,
the first bearing and the second bearing are mounted to the supported end portion, and
the nut is mounted to the threaded end portion, such that the rotation of the lead screw is converted to a linear movement of the nut.

12. The motor device according to claim 1, wherein the first bearing and the second bearing are both deep groove ball bearings.

13. The motor device according to claim 1, wherein the transmission mechanism comprises a worm that is configured to receive power from the motor to rotate, and a gear that is coaxially fixed to the lead screw and meshed with the worm.

14. The motor device according to claim 1, wherein the lubricant is a grease lubricant.

15. The motor device according to claim 14, wherein the grease lubricant is an extreme pressure lithium-based grease.

16. The motor device according to claim 1, wherein the transmission cavity is adjacent to an edge of the housing cavity, and the partition and a portion of the housing outer wall together define the transmission cavity.

17. A motor device, comprising:
a motor;
a lead screw;
a transmission mechanism, configured to transmit rotation from the motor to the lead screw; and
a housing, comprising a housing outer wall that defines a housing cavity and a partition that defines a transmission cavity for accommodating the transmission mechanism;
a first bearing and a second bearing, mounted to the lead screw to support the lead screw,
wherein the transmission cavity is inside the housing cavity, between the first bearing and the second bearing,
the housing cavity further accommodates at least a portion of the lead screw,
the partition comprises a first protruding sidewall and a second protruding sidewall respectively on either side of the transmission cavity, wherein a first bearing end surface of the outer ring of the first bearing close to the transmission cavity is adjacent to the first protruding sidewall, and a third bearing end surface of the outer ring of the second bearing close to the transmission cavity is adjacent to the second protruding sidewall, and
the transmission cavity is sealed for a lubricant that is used for the transmission mechanism and contained in the transmission cavity;
the housing further comprises a third protruding sidewall and a fourth protruding sidewall,
a second bearing end surface of the outer ring of the first bearing facing away from the transmission cavity is adjacent to the third protruding sidewall, and a fourth bearing end surface of the outer ring of the second bearing facing away from the transmission cavity is adjacent to the fourth protruding sidewall;
a first gap between the first bearing end surface of the outer ring of the first bearing and the first protruding sidewall has a first gap width, and a second gap between the third bearing end surface of the outer ring of the second bearing and the second protruding sidewall has a second gap width, a third gap between the second bearing end surface of the outer ring of the first bearing and the third protruding sidewall has a third gap width, a fourth gap between the fourth bearing end surface of the outer ring of the second bearing and the fourth protruding sidewall has a fourth gap width,
the first gap width is smaller than the fourth gap width, and the second gap width is smaller than the third gap width.

* * * * *